US012549277B2

(12) United States Patent
Schellmann et al.

(10) Patent No.: US 12,549,277 B2
(45) Date of Patent: Feb. 10, 2026

(54) TECHNIQUES FOR BLIND COOPERATIVE RETRANSMISSIONS

(71) Applicant: Huawei Technologies Co., Ltd., Shenzhen (CN)

(72) Inventors: Malte Schellmann, Munich (DE); Ömer Bulakci, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 622 days.

(21) Appl. No.: 17/878,663

(22) Filed: Aug. 1, 2022

(65) Prior Publication Data

US 2022/0368455 A1 Nov. 17, 2022

Related U.S. Application Data

(63) Continuation of application No. PCT/EP2020/060705, filed on Apr. 16, 2020.

(51) Int. Cl.
*H04L 1/16* (2023.01)
*H04L 1/00* (2006.01)
(Continued)

(52) U.S. Cl.
CPC .............. *H04L 1/0026* (2013.01); *H04L 1/08* (2013.01); *H04L 1/1621* (2013.01)

(58) Field of Classification Search
CPC ....... H04L 1/0026; H04L 1/08; H04L 1/1621; H04L 1/1845; H04L 2001/0093; H04L 2001/0097
See application file for complete search history.

(56) References Cited

U.S. PATENT DOCUMENTS 9,503,837 B2 * 11/2016 Kim ................... H04L 1/1854
2009/0262678 A1 * 10/2009 Oyman ................ H04L 1/1867
370/315

(Continued)

FOREIGN PATENT DOCUMENTS

WO 2017117253 A1 7/2017
WO 2017185201 A1 11/2017
WO 2020078533 A1 4/2020

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.1.0, pp. 1-386, 3rd Generation Partnership Project, Valbonne, France (Mar. 2020).

*Primary Examiner* — Jay P Patel
(74) *Attorney, Agent, or Firm* — Leydig, Voit & Mayer, Ltd.

(57) ABSTRACT

A network device is configured to: obtain, from a first communication device, quality information about a quality of a radio link of the first communication device to one or more second communication devices; and provide to the one or more second communication devices and to the first communication device control information. The control information includes: membership information about a membership of the one or more second communication devices to one or more retransmission groups, and instructions on a group-specific retransmission of a data packet by members of a retransmission group.

21 Claims, 11 Drawing Sheets

(51) Int. Cl.
*H04L 1/08* (2006.01)
*H04L 1/1607* (2023.01)

(56) References Cited

U.S. PATENT DOCUMENTS

| | | | | |
|---|---|---|---|---|
| 2012/0014349 A1* | 1/2012 | Chung | ............ | H04W 72/0453 |
| | | | | 370/329 |
| 2014/0071903 A1* | 3/2014 | Sorrentino | ............ | H04W 52/54 |
| | | | | 370/329 |
| 2014/0098719 A1* | 4/2014 | Kim | ............ | H04L 5/0094 |
| | | | | 370/328 |
| 2015/0271790 A1* | 9/2015 | Lee | ............ | H04W 48/16 |
| | | | | 455/450 |
| 2016/0301515 A1* | 10/2016 | Ouchi | ............ | H04W 72/21 |
| 2016/0309542 A1* | 10/2016 | Kowalski | ............ | H04W 72/23 |
| 2016/0381681 A1* | 12/2016 | Nogami | ............ | H04L 5/0057 |
| | | | | 370/280 |
| 2017/0005770 A1* | 1/2017 | Shimezawa | ............ | H04L 1/0027 |
| 2018/0013522 A1* | 1/2018 | Liu | ............ | H04L 1/1854 |
| 2018/0019794 A1* | 1/2018 | Kowalski | ............ | H04L 5/003 |
| 2018/0019844 A1* | 1/2018 | Nogami | ............ | H04L 5/0055 |
| 2018/0020335 A1* | 1/2018 | Yin | ............ | H04W 28/0268 |
| 2018/0048447 A1* | 2/2018 | Nogami | ............ | H04L 5/0048 |
| 2019/0020381 A1* | 1/2019 | Tooher | ............ | H04W 88/04 |
| 2019/0281587 A1* | 9/2019 | Zhang | ............ | H04W 72/23 |
| 2019/0349960 A1* | 11/2019 | Li | ............ | H04L 5/0091 |
| 2019/0363843 A1* | 11/2019 | Gordaychik | ............ | H04W 72/044 |
| 2020/0044812 A1* | 2/2020 | Yang | ............ | H04W 72/23 |
| 2020/0053670 A1* | 2/2020 | Jung | ............ | H04W 56/0015 |
| 2020/0077417 A1* | 3/2020 | Seok | ............ | H04L 1/1841 |
| 2020/0092685 A1* | 3/2020 | Fehrenbach | ............ | H04W 72/23 |
| 2020/0367217 A1* | 11/2020 | Wang | ............ | H04L 5/0094 |
| 2021/0211957 A1* | 7/2021 | Kamohara | ............ | H04W 36/06 |
| 2021/0297199 A1* | 9/2021 | Miao | ............ | H04L 5/0023 |
| 2022/0240182 A1* | 7/2022 | Baldemair | ............ | H04W 52/0229 |

* cited by examiner

TECHNIQUES FOR BLIND COOPERATIVE RETRANSMISSIONS

CROSS-REFERENCE TO RELATED APPLICATIONS

This application is a continuation of International Application No. PCT/EP2020/060705, filed on Apr. 16, 2020, the disclosure of which is hereby incorporated by reference in its entirety.

FIELD

The present disclosure relates to techniques for Blind Cooperative Retransmissions, in particular, via sidelink to support Ultra-Reliable Low-Latency Communications (URLLC) traffic in Industrial Internet-of-Things (IIoT) communications, in particular, in communication systems such as 5th generation mobile network (5G) New Radio (NR). The disclosure relates to a network device such as a base station (BS), a first communication device or target User Equipment and a second communication device or neighbor User Equipment supporting Blind Cooperative Retransmissions. The disclosure further relates to corresponding methods.

BACKGROUND

An exemplary factory of the future with an industrial IoT (IIoT) setup 100 is shown in FIG. 1: all devices 101, 102, 103, 130 distributed in the factory area communicate wirelessly 111, 112, 115, 116, 117 with one or more base station(s) (BS) 120 located at fixed positions in the factory hall. The devices may be either at fixed positions or moving around the hall (e.g., automated guided vehicles—AGV). Due to the dynamic movement of AGVs and corresponding potential blocking of the radio signal, the link between BS 120 and a device, e.g., device 102 in FIG. 1, may become severely degraded suddenly, resulting in failure of an ongoing data transmission 116 between BS 120 and the device 102. In an alternative setting, the BS 120 may also be mobile or nomadic, e.g., installed on AGVs or being an integrated access backhaul (IAB) node. In such a setting, the quality of the communication links may vary more severely, e.g., even for devices at fixed locations.

In such cases, conventionally a retransmission of the lost data packet is triggered by the receiver, who sends a negative acknowledgment (NACK) signal. The retransmission is then carried out in a successive time slot, usually by using different frequency resources for transmission or, if possible, by using another independent radio link, both aiming at taking advantage of diversity gains. Since industrial IoT applications have often very strict time constraints, requiring a packet to be successfully received in, e.g., less than a millisecond, there is insufficient time buffer available to accommodate the NACK signaling as well as the scheduling of retransmissions. Further, if the radio link 116 between BS 120 and the device 102 is blocked, the gains available from frequency diversity are rather small, which may call for larger bandwidth for the retransmission. This latter issue can become even more pronounced since it is expected that in a future factory there may be hundreds of devices with demands for ultra-reliable low-latency communication (URLLC), so there is a strong need for reasonable spectral efficiency even for URLLC services. For those reasons, alternative retransmission schemes are required for these scenarios that can provide considerable diversity gains while being realizable at sufficiently low costs in delay. The same problems exist for similar scenarios like in the context of vehicle-to-anything (V2X) communication where highly mobile User Equipments are communicating with a network.

SUMMARY

This disclosure provides techniques for improving communication in industrial IoT communication setups as exemplarily shown in FIG. 1.

According to a first aspect, the disclosure relates to a network device, wherein the network device is configured to: obtain, from a first communication device quality information about a quality of a radio link of the first communication device to one or more second communication devices; and provide to the one or more second communication devices and to the first communication device control information, wherein the control information includes:— membership information about a membership of the one or more second communication devices to the one or more retransmission groups and—instructions on a group-specific retransmission of a data packet by the members of a retransmission group.

Obtaining the quality information means that the quality information can be received from the first communication device, e.g., by a received message. Obtaining the quality information can also mean that the quality information is available from the network, e.g., by a prior network exploration process or by a data base of the network, and the quality information can be requested from the network.

The group-specific retransmission means that the instruction is for the entire group and relates to a retransmission by the members of that group. The retransmissions are performed by all members of the group so that a cooperative retransmission using all members of the group can be performed, thereby increasing efficiency in case that some links are broken or have a poor signal quality.

The network device can be a base station or an access point, for example. The communication devices can be radio communication devices such as User Equipments (UEs), e.g., IoT UEs, cars, robots, machines, etc.

Such a network device can control a communication within a communication network including a first communication device and one or more second communication devices for performing blind cooperative retransmissions. These blind retransmissions can exploit sufficient diversity from independent channel path, in particular, if the direct link between network device and first communication device is blocked by an obstacle. The network device is capable of controlling the communication network with respect to the strict latency constraints of IIoT, in particular, in cases where not enough time is available for explicit request of retransmissions.

The network device thus supports a scheme for blind cooperative relayed retransmissions on pre-configured resources to minimize latency. The network device also supports the corresponding signaling procedures.

The network device advantageously provides a scheme for blind cooperative retransmissions for sidelink assisted Uu communications supporting URLLC for IIoT by meeting high availability and tight latency constraints and supporting a larger number of IIoT devices. The process of cooperative retransmission can be fully controlled and configured by the gNB. The network device provides an efficient signaling where all configurations needed for cooperative retransmissions may be contained within a single DCI message. Thus, blind retransmission can be carried out without any delays due to additional signaling.

In an exemplary implementation of the network device, the radio link of the first communication device to the one or more second communication devices is a sidelink radio link.

A sidelink radio link is a direct radio link between two communication devices without going through the network device or base station.

In an exemplary implementation of the network device, the network device is configured to provide the control information to the first communication device and to the one or more second communication devices by a Downlink Control Information (DCI) message.

In an exemplary implementation of the network device, the control information comprises a group-specific transmission diversity scheme and a group-specific transmission power per communication device for each retransmission group.

In an exemplary implementation of the network device, the control information comprises a group-specific retransmission resource for each second communication device of a retransmission group.

In an exemplary implementation of the network device, the instructions instruct the second communication devices of a respective retransmission group to retransmit the data packet by using the group-specific retransmission resource and applying the group-specific transmission diversity scheme and the group-specific transmission power.

In an exemplary implementation of the network device, the network device is configured to provide information on the grouping of the communication devices, the group-specific transmission diversity scheme and the group-specific transmission power by radio resource control (RRC) signaling; and provide information on the group-specific retransmission resource by DCI signaling.

In an exemplary implementation of the network device, the DCI message comprises a retransmission group index indicating a respective retransmission group for carrying out a retransmission.

In an exemplary implementation of the network device, the network device is configured to: instruct the members of a retransmission group to retransmit an Ultra-Reliable Low-Latency Communication, URLLC, downlink data packet received from the network device to the first communication device; and/or instruct the members of a retransmission group to retransmit an Ultra-Reliable Low-Latency Communication, URLLC, uplink data packet received from the first communication device to the network device.

In an exemplary implementation of the network device, the URLLC downlink data packet retransmission is based on blind cooperative relayed retransmissions for URLLC downlink, and the URLLC uplink data packet retransmission is based on blind cooperative relayed retransmissions for URLLC uplink.

In an exemplary implementation of the network device, the instructions on the group-specific retransmission of a data packet instruct the members of a retransmission group to cooperatively carry out a retransmission of the same data packet.

In an exemplary implementation of the network device, the network device is configured to determine the grouping of the one or more second communication devices based on respective sidelink radio link qualities between the one or more second communication devices and the first communication device and/or based on Uu radio link qualities between the one or more second communication devices and the network device.

Uu radio link, also referred to as uplink or downlink, is a direct radio link between a communication device and the network device or base station without going through a neighboring or another communication device.

In an exemplary implementation of the network device, the network device is configured to exclude second communication devices from the grouping which sidelink radio link qualities and/or Uu radio link qualities are below a threshold.

In an exemplary implementation of the network device, the network device is configured to determine the grouping of the one or more second communication devices based on information obtained from the network.

In an exemplary implementation of the network device, the network device is configured to determine the grouping of the one or more second communication devices based on at least one of the following: reported Uu radio link qualities, reported sidelink radio link qualities, mobility patterns, history information, predicted link quality, management schemes obtained from network data analytics function and/or management data analytics function.

In an exemplary implementation of the network device, the network device is configured to: combine uplink data packets received from a transmission of the first communication device and/or from a retransmission of at least one second communication device; and decode a combined uplink data packet resulting from the combination.

In an exemplary implementation of the network device, the network device is configured to: transmit an early acknowledge message to the first communication device and/or the one or more second communication devices upon successfully decoding the combined uplink data packet, wherein the early acknowledge message indicates a successful decoding and instructs the at least one second communication device to interrupt retransmission.

In an exemplary implementation of the network device, the network device is configured to: determine a respective signal quality of the uplink data packets received from the retransmissions of the one or more second communication devices; and transmit an acknowledge message to the first communication device and to all second communication devices belonging to the retransmission group of the second communication device which retransmission has the highest signal quality.

According to a second aspect, the disclosure relates to a first communication device, wherein the first communication device is configured to: provide to a network device quality information about a quality of a radio link of the first communication device to one or more second communication devices; obtain control information from the network device, wherein the control information includes:—membership information about a membership of the one or more second communication devices to one or more retransmission groups, and—instructions on a group-specific retransmission of a data packet by the members of a retransmission group; and receive at least one retransmission of a data packet from the one or more second communication devices according to the control information, and/or transmit a data packet for the network device to the one or more second communication devices according to the control information.

The quality information may for example be provided by transmitting a message to the network device or by providing information to the network device where this quality information is located, e.g., a pointer to a data base where the quality information is available.

Such a first communication device, e.g., a target UE, supports a scheme for performing blind cooperative retransmissions. These blind retransmissions can exploit sufficient diversity from independent channel path, in particular, if the direct link to the network device is blocked by an obstacle. The first communication device is able to support the strict latency constraints of IIoT, in particular, in cases where not enough time is available for explicit request of retransmissions.

The first communication device thus supports a scheme for blind cooperative relayed retransmissions on pre-configured resources to minimize latency. The corresponding signaling procedures are also supported by the first communication device.

The first communication device advantageously supports a scheme for blind cooperative retransmissions for sidelink assisted Uu communications supporting URLLC for IIoT by meeting high availability and tight latency constraints and supporting a larger number of IIoT devices. The process of cooperative retransmission can be fully controlled and configured by the gNB. The first communication device supports an efficient signaling where all configurations needed for cooperative retransmissions may be contained within a single DCI message. Thus, blind retransmission can be carried out without any delays due to additional signaling.

In an exemplary implementation of the first communication device, the radio link of the first communication device to the one or more second communication devices is a sidelink radio link.

In an exemplary implementation of the first communication device, the first communication device is configured to receive the control information from the network device by a Downlink Control Information (DCI) message.

In an exemplary implementation of the first communication device, the control information comprises a group-specific transmission diversity scheme and a group-specific transmission power per communication device for each retransmission group.

In an exemplary implementation of the first communication device, the control information comprises a group-specific retransmission resource for each second communication device of a retransmission group.

In an exemplary implementation of the first communication device, the instructions instruct the second communication devices of a respective retransmission group to retransmit the data packet by using the group-specific retransmission resource and applying the group-specific transmission diversity scheme and the group-specific transmission power.

In an exemplary implementation of the first communication device, the first communication device is configured to: receive information on the grouping of the communication devices, the group-specific transmission diversity scheme and the group-specific transmission power by radio resource control, RRC, signaling; and receive information on the group-specific retransmission resource by DCI signaling.

In an exemplary implementation of the first communication device, the DCI message comprises a retransmission group index indicating a respective retransmission group for carrying out each retransmission.

In an exemplary implementation of the first communication device, the first communication device is configured to: receive an Ultra-Reliable Low-Latency Communication, URLLC, downlink data packet from the network device via at least one retransmission from the one or more second communication devices; and/or transmit an Ultra-Reliable Low-Latency Communication, URLLC, uplink data packet via at least one retransmission of the one or more second communication devices to the network device.

In an exemplary implementation of the first communication device, the URLLC downlink data packet retransmission is based on blind cooperative relayed retransmissions for URLLC downlink, and the URLLC uplink data packet retransmission is based on blind cooperative relayed retransmissions for URLLC uplink.

In an exemplary implementation of the first communication device, the instructions on the group-specific retransmission of a data packet instruct the second communication devices of a retransmission group to cooperatively carry out a retransmission of the same data packet.

In an exemplary implementation of the first communication device, the grouping of the one or more second communication devices is based on respective sidelink radio link qualities between the one or more second communication devices and the first communication device and/or based on Uu radio link qualities between the one or more second communication devices and the network device.

In an exemplary implementation of the first communication device, second communication devices which sidelink radio link qualities and/or Uu radio link qualities are below a threshold are excluded from the grouping.

In an exemplary implementation of the first communication device, the grouping of the one or more second communication devices is based on information obtained from the network.

In an exemplary implementation of the first communication device, the grouping of the one or more second communication devices is based on at least one of the following: reported Uu radio link qualities, reported sidelink radio link qualities, mobility patterns, history information, predicted link quality, management schemes obtained from network data analytics function and/or management data analytics function.

In an exemplary implementation of the first communication device, the first communication device is configured to: combine downlink data packets received from a transmission of the network device and/or from a retransmission of at least one second communication device; and decode a combined downlink data packet resulting from the combination.

In an exemplary implementation of the first communication device, the first communication device is configured to: transmit an early acknowledge message to the network device and the at least one second communication device upon successfully decoding the combined downlink data packet, wherein the early acknowledge message indicates a successful decoding and instructs the at least one second communication device to interrupt retransmission.

In an exemplary implementation of the first communication device, the first communication device is configured to: determine a respective signal quality of the downlink data packets received from the retransmissions of the second communication devices; and transmit an acknowledge message to the network device and to all second communication devices belonging to the retransmission group of the second communication which retransmission has the highest signal quality.

According to a third aspect, the disclosure relates to a second communication device, wherein the second communication device is configured to: obtain control information from a network device, wherein the control information includes membership information about a membership of the one or more second communication devices to a retransmission group of one or more retransmission groups and instructions on a group-specific retransmission of a data packet by the members of a retransmission group; receive a data packet from the network device or from the first communication device; and retransmit the data packet to the first communication device or the network device according to the control information.

Such a second communication device, e.g., a neighboring UE, supports a scheme for performing blind cooperative retransmissions. These blind retransmissions can exploit sufficient diversity from independent channel path, in particular, if the direct link between first communication device and network device is blocked by an obstacle. The second communication devices are able to support the strict latency constraints of IIoT, in particular, in cases where not enough time is available for explicit request of retransmissions.

The second communication device thus supports a scheme for blind cooperative relayed retransmissions on pre-configured resources to minimize latency. The corresponding signaling procedures are also supported by the second communication device.

The second communication devices advantageously support a scheme for blind cooperative retransmissions for sidelink assisted Uu communications supporting URLLC for IIoT by meeting high availability and tight latency constraints and supporting a larger number of IIoT devices. The process of cooperative retransmission can be fully controlled and configured by the gNB. The second communication device supports an efficient signaling where all configurations needed for cooperative retransmissions may be contained within a single DCI message. Thus, blind retransmission can be carried out without any delays due to additional signaling.

In an exemplary implementation of the second communication device, the second communication device is configured to retransmit the data packet on a sidelink radio link to the first communication device or on an Uu radio link to the network device.

In an exemplary implementation of the second communication device, the second communication device is configured to receive the control information from the network device by a Downlink Control Information (DCI) message.

In an exemplary implementation of the second communication device, the control information comprises a group-specific transmission diversity scheme and a group-specific transmission power per communication device for each retransmission group, and additionally a group-specific retransmission resource for each second communication device of a retransmission group.

In an exemplary implementation of the second communication device, the instructions instruct the second communication device to retransmit the data packet by using the group-specific retransmission resource and applying the group-specific transmission diversity scheme and the group-specific transmission power.

In an exemplary implementation of the second communication device, the second communication device is configured to receive information on the grouping of the communication devices, the group-specific transmission diversity scheme and the group-specific transmission power by radio resource control (RRC) signaling; and receive information on the group-specific retransmission resource by DCI signaling.

In an exemplary implementation of the second communication device, the DCI message comprises a retransmission group index indicating a respective retransmission group for carrying out each retransmission.

In an exemplary implementation of the second communication device, the second communication device is configured to: receive an Ultra-Reliable Low-Latency Communication, URLLC, downlink data packet from the network device for URLLC downlink data packet retransmission to the first communication device; and/or receive an Ultra-Reliable Low-Latency Communication, URLLC, uplink data packet from the first communication device for URLLC uplink data packet retransmission to the network device.

In an exemplary implementation of the second communication device, the URLLC downlink data packet retransmission is based on blind cooperative relayed retransmissions for URLLC downlink, and the URLLC uplink data packet retransmission is based on blind cooperative relayed retransmissions for URLLC uplink.

In an exemplary implementation of the second communication device, the instructions on the group-specific retransmission of a data packet instruct the second communication device to cooperatively carry out a retransmission of the same data packet with other second communication devices of the same retransmission group.

In an exemplary implementation of the second communication device, the membership of the second communication device to a retransmission group is based on respective sidelink radio link qualities between the one or more second communication devices and the first communication device and/or based on Uu radio link qualities between the one or more second communication devices and the network device.

In an exemplary implementation of the second communication device, the second communication device is excluded from the membership to a retransmission group if its sidelink radio link quality and/or Uu radio link quality is below a threshold.

In an exemplary implementation of the second communication device, the membership of the second communication device to a retransmission group is based on information obtained from the network.

In an exemplary implementation of the second communication device, the membership of the second communication device to a retransmission group is based on at least one of the following: reported Uu radio link qualities, reported sidelink radio link qualities, mobility patterns, history information, predicted link quality, management schemes obtained from network data analytics function and/or management data analytics function.

In an exemplary implementation of the second communication device, the second communication device is configured to receive an early acknowledge message from the network device or from the first communication device, wherein the early acknowledge message indicates a successful decoding and instructs the second communication device to interrupt retransmission.

In an exemplary implementation of the second communication device, the second communication device is configured to forward an acknowledge message received from the network device to the first communication device by using the same transmit configuration (i.e., diversity scheme & transmit power) as used for the retransmission of the data packet; and/or forward an acknowledge message received from the first communication device to the network device by using the same transmit configuration (i.e., diversity scheme & transmit power) as used for the retransmission of the data packet.

According to a fourth aspect, the disclosure relates to a method for configuring a first communication device and one or more second communication device for cooperative retransmission, the method comprising: obtaining, from the first communication device, quality information about a quality of a radio link of the first communication device to one or more second communication devices; and providing, to the one or more second communication devices and to the first communication device, control information, wherein the control information includes: membership information about a membership of the one or more second communication device to the one or more retransmission groups and instructions on a group-specific retransmission of a data packet by the members of a retransmission group.

In an exemplary implementation of the method according to the fourth aspect, the radio link of the first communication device to the one or more second communication devices is a sidelink radio link.

In an exemplary implementation of the method according to the fourth aspect, the method comprises: providing the control information to the first communication device and to the one or more second communication devices by a Downlink Control Information (DCI) message.

In an exemplary implementation of the method according to the fourth aspect, the control information comprises a group-specific transmission diversity scheme and a group-specific transmission power per communication device for each retransmission group, and additionally a group-specific retransmission resource for each second communication device of a retransmission group.

According to a fifth aspect, the disclosure relates to a method for performing cooperative retransmission by a first communication device, the method comprising: providing, to a network device, quality information about a quality of a radio link of the first communication device to one or more second communication devices; obtaining control information from the network device, wherein the control information includes: membership information about a membership of the one or more second communication devices to one or more retransmission groups and instructions on a group-specific retransmission of a data packet by the members of a retransmission group; and receiving at least one retransmission of a data packet from the one or more second communication devices according to the control information, and/or transmitting a data packet for the network device to the one or more second communication devices according to the control information.

In an exemplary implementation of the method according to the fifth aspect, the radio link of the first communication device to the one or more second communication devices is a sidelink radio link.

In an exemplary implementation of the method according to the fifth aspect, the method comprises: receiving the control information from the network device by a Downlink Control Information (DCI) message.

In an exemplary implementation of the method according to the fifth aspect, the control information comprises a group-specific transmission diversity scheme and a group-specific transmission power per communication device for each retransmission group, and additionally a group-specific retransmission resource for each second communication device of a retransmission group.

According to a sixth aspect, the disclosure relates to a method for performing cooperative retransmission by a second communication device, the method comprising: receiving control information from a network device, wherein the control information includes: membership information about a membership of the second communication device to a retransmission group of one or more retransmission groups and instructions on a group-specific retransmission of a data packet by the members of a retransmission group; receiving a data packet from the network device or from the first communication device; and retransmitting the data packet to the first communication device or the network device according to the control information.

In an exemplary implementation of the method according to the sixth aspect, the method comprises: retransmitting the data packet on a sidelink radio link to the first communication device or on an Uu radio link to the network device.

In an exemplary implementation of the method according to the sixth aspect, the method comprises: receiving the control information from the network device by a Downlink Control Information (DCI) message.

In an exemplary implementation of the method according to the sixth aspect, the control information comprises a group-specific transmission diversity scheme and a group-specific transmission power per communication device for each retransmission group, and additionally a group-specific retransmission resource for each second communication device of a retransmission group.

In an exemplary implementation of the method according to the sixth aspect, the method comprises: retransmitting the data packet by using the group-specific retransmission resource and applying the group-specific transmission diversity scheme and the group-specific transmission power.

According to a seventh aspect, the disclosure relates to a computer program product including computer executable code or computer executable instructions that, when executed, causes at least one computer to execute the method according to the aspects above. Such a computer program product may include a non-transient readable storage medium storing program code thereon for use by a processor, the program code comprising instructions for performing the methods or the computing blocks as described hereinafter.

BRIEF DESCRIPTION OF THE DRAWINGS

Further embodiments of the disclosure will be described with respect to the following figures, in which.

DETAILED DESCRIPTION

Figure 1:
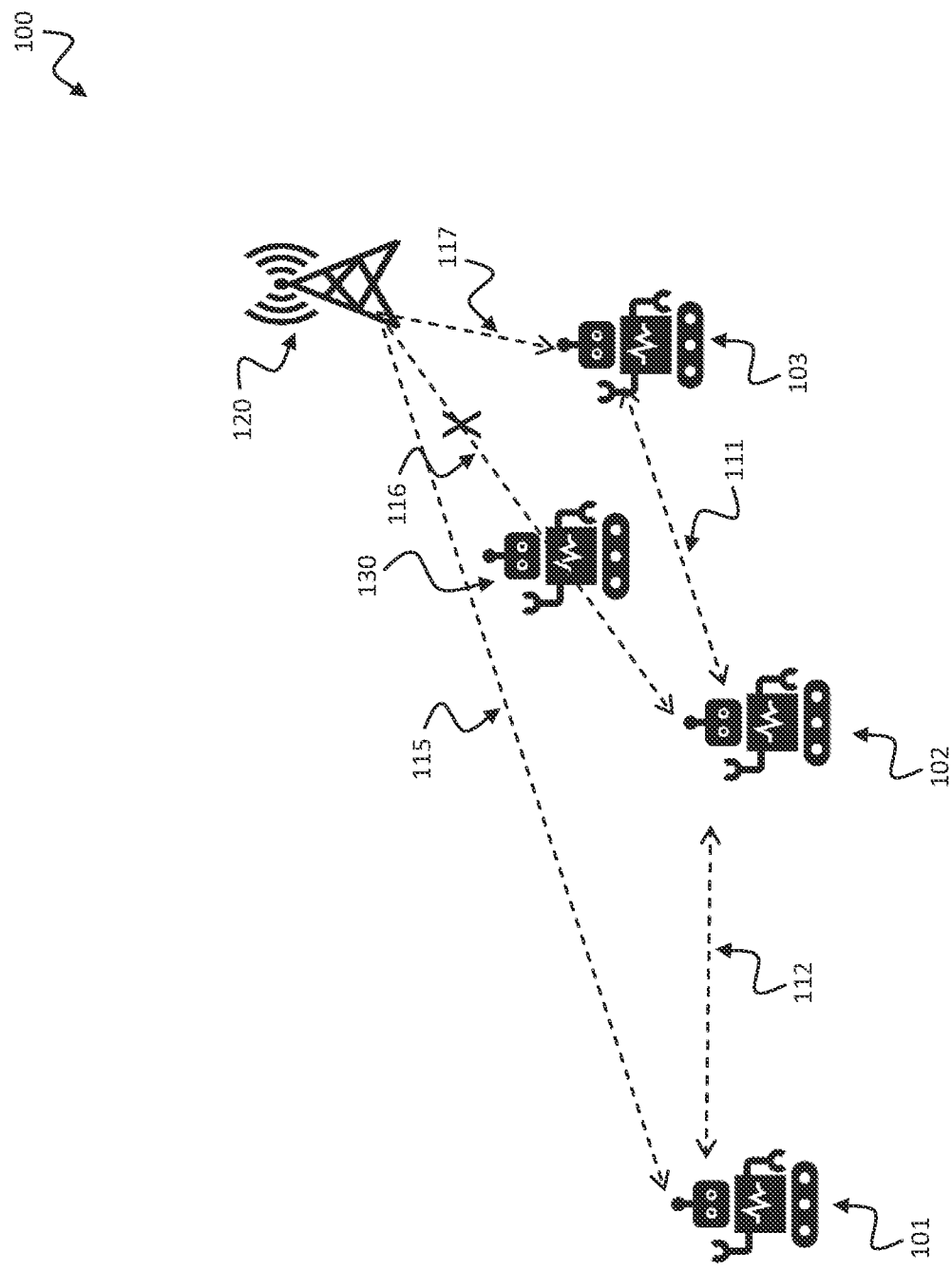
FIG. 1 shows a schematic diagram 100 illustrating an exemplary industrial IoT scenario for the application of blind cooperative retransmission according to the disclosure.

In order to describe the disclosure in detail, the following terms, abbreviations and notations will be used:
URLLC: Ultra-reliable low-latency communications
DCI: Downlink Control Information
IoT: Internet-of-Things
IIoT: Industrial IoT
AGV: Automated guided vehicles
IAB: Integrated Access Backhaul
V2N: Vehicle-to-Network
gNB: base station in 5G notation
V2X: Vehicle-to-anything
UE: User Equipment
UL: uplink
DL: downlink
SL: sidelink
ACK: Acknowledgement
NR: New Radio (standard)
RRC: radio resource control
G-RNTI: Group network temporary identifier
NWDAF: network data analytics function
MDAF: management data analytics function
Rtx: retransmission In the following detailed description, reference is made to the accompanying drawings, which form a part thereof, and in which is shown by way of illustration exemplary aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if an exemplary method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods, devices and systems described herein may be implemented in wireless communication networks based on 5G New Radio (NR) mobile communication standards and beyond.

The methods, devices and systems described herein may also be implemented in wireless communication networks based on mobile communication standards such as long term evolution (LTE), in particular, 3rd generation mobile network (3G), 4th generation mobile network (4G) and 4.5th generation mobile network (4.5G). The methods, devices and systems described herein may also be implemented in wireless communication networks, in particular, communication networks similar to wireless fidelity (WiFi) communication standards according to IEEE 802.11. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender). However, devices described herein are not limited to transmit and/or receive radio signals, also other signals designed for transmission in deterministic communication networks may be transmitted and/or received.

The devices and systems described herein may include processors or processing devices, memories and transceivers, i.e., transmitters and/or receivers. In the following description, the term "processor" or "processing device" describes any device that can be utilized for processing tasks (or blocks or steps). A processor or processing device can be a single processor or a multi-core processor or can include a set of processors or can include means for processing. A processor or processing device can process software or firmware or applications etc.

The methods, devices and systems described herein may be implemented in wireless communication networks based on blind retransmission schemes as supported by the 5G NR V2X standard. This standard supports short latencies for retransmission by introducing the blind retransmission scheme, which is supported by 5G NR V2X for a single transmitter via Uu link (BS⇆UE) or via sidelink (UE⇆UE). Here, the BS schedules for a URLLC data transmission the first transmission as well as successive retransmissions simultaneously and signals this batch of scheduled grants to the UE via the control channel in one single downlink control information (DCI) message. The UE can then carry out transmissions and retransmission in the successively scheduled radio slots without waiting for further advices or grants, respectively. However, the standard defines this blind retransmission scheme only for a single transmitter, and hence only frequency diversity can be exploited. If the Uu link (BS⇆UE) is blocked, gains from this type of diversity are strictly limited, since the whole link suffers from the strong shadow fading. The techniques for blind cooperative relayed retransmissions as described in this disclosure can be applied in the 5G NR V2X standard in order to overcome this deficiency.

A basic idea of this disclosure is the cooperative aspect in the blind retransmissions by other UEs in the neighborhood of the target UE, where 1) the BS defines the groups of UEs (e.g., from the list of neighbor UEs provided by the target UE) which shall carry out the retransmissions (e.g., one exemplary UE group per retransmission); 2) the BS defines the transmission (TX) diversity schemes to be used by each UE group and the power allocation; 3) the BS assigns a (single) resource for retransmission per group; and 4) each UE group retransmits the received packet (only those UEs that could successfully receive the packet) cooperatively in the dedicated resource by applying the TX diversity scheme and power allocation defined by the base station, i.e., all UE of the group transmit their signal in the identical resource.

While the information under items 1 and 2 can be conveyed by radio resource control (RRC) signaling, since the neighbor UEs of the target UE may change slowly over time, the information under item 3 would rather be conveyed through DCI. Compared to existing state of the art, DCI needs to contain the UE group index indicating the group for carrying out each retransmission. Therefore, a novel data field in DCI is introduced, which goes beyond what is available today and also suggested by other patent ideas.

For the applicability of this idea, the following requirements may be considered: 1) feedback from target UE to BS about neighboring UEs; and 2) signaling from BS (DCI/ RRC), which needs to include new field(s) for cooperatively retransmitting UEs. Examples of such signaling is described below in this disclosure. The disclosure presents a scheme for blind cooperative relayed retransmission on pre-configured resources for minimum latency, allowing to benefit from diversity gains offered by independent radio links between different UEs and the target UE. Additionally, the disclosure presents signaling procedures required to facilitate blind cooperative relayed retransmissions.

FIG. 1 shows a schematic diagram 100 illustrating an exemplary industrial IoT scenario for the application of blind cooperative retransmission according to the disclosure.

An exemplary factory of the future with an industrial IoT (IIoT) setup 100 is shown in FIG. 1. All devices 101, 102, 103, 130 distributed in the factory area communicate wirelessly 111, 112, 115, 116, 117 with one or more base station(s) (BS) 120 located at fixed positions in the factory hall. The devices may be either at fixed positions or moving around the hall (e.g., automated guided vehicles—AGV). Due to the dynamic movement of AGVs and corresponding potential blocking of the radio signal, the link between BS 120 and a device, e.g., device 102 in FIG. 1, may become severely degraded suddenly, resulting in failure of an ongoing data transmission 116 between BS 120 and the device 102. In an alternative setting, the BS 120 may also be mobile or nomadic, e.g., installed on AGVs or being an integrated access backhaul (IAB) node. In such a setting, the quality of the communication links may vary more severely, e.g., even for devices at fixed locations.

In the following, techniques are presented that improve communication in industrial IoT communication setups 100 as exemplarily shown in FIG. 1.

Figure 2:
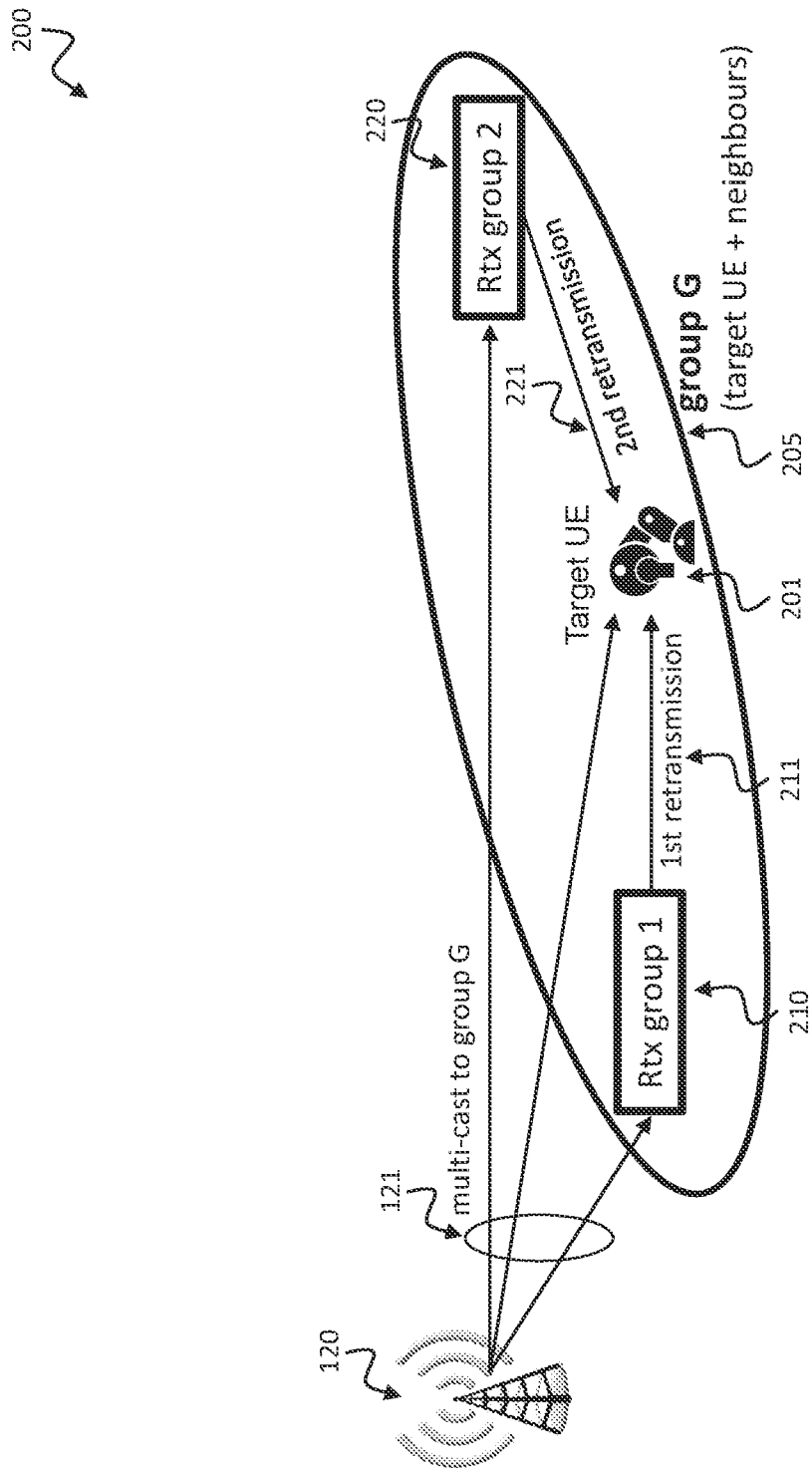
FIG. 2 shows a schematic diagram illustrating exemplary blind cooperative relayed retransmissions for URLLC downlink 200 according to the disclosure.

FIG. 2 shows a schematic diagram illustrating exemplary blind cooperative relayed retransmissions for URLLC downlink 200 according to the disclosure.

The scheme shown in FIG. 2 includes a base station 120 or gNB, also referred to as a network device that connects a plurality of communication devices to a communication network, e.g., according to the scenario depicted in FIG. 1. Such communication devices may be components such as machines or robots or automated guided vehicles in an Industrial IoT scenario. In the scheme shown in FIG. 2, the base station 120 transmits a multicast signal 121 to a group G, 205 that includes a target UE 201 and neighbor UEs. The group may include UEs that can be connected to the base station 120, e.g., UEs within a radio cell served by the base station. The neighbor UEs are grouped in retransmission (Rtx) groups 210, 220. In the scheme shown in FIG. 2 an exemplary number of two Rtx groups 210, 220 is shown. However, any other number of Rtx groups can be applied as well. The UEs of Rtx group 1, 210 initiate a first retransmission 211 of data packets received from the base station 120 to the target UE 201 while the UEs of Rtx group 2, 220 initiate a second retransmission 221 of data packets received from the base station 120 to the target UE 201.

The scheme shown in FIG. 2 specifies blind cooperative relayed retransmission on pre-configured resources for minimum latency, allowing to benefit from diversity gains offered by independent radio links between different UEs and the target UE 201.

Figure 3:
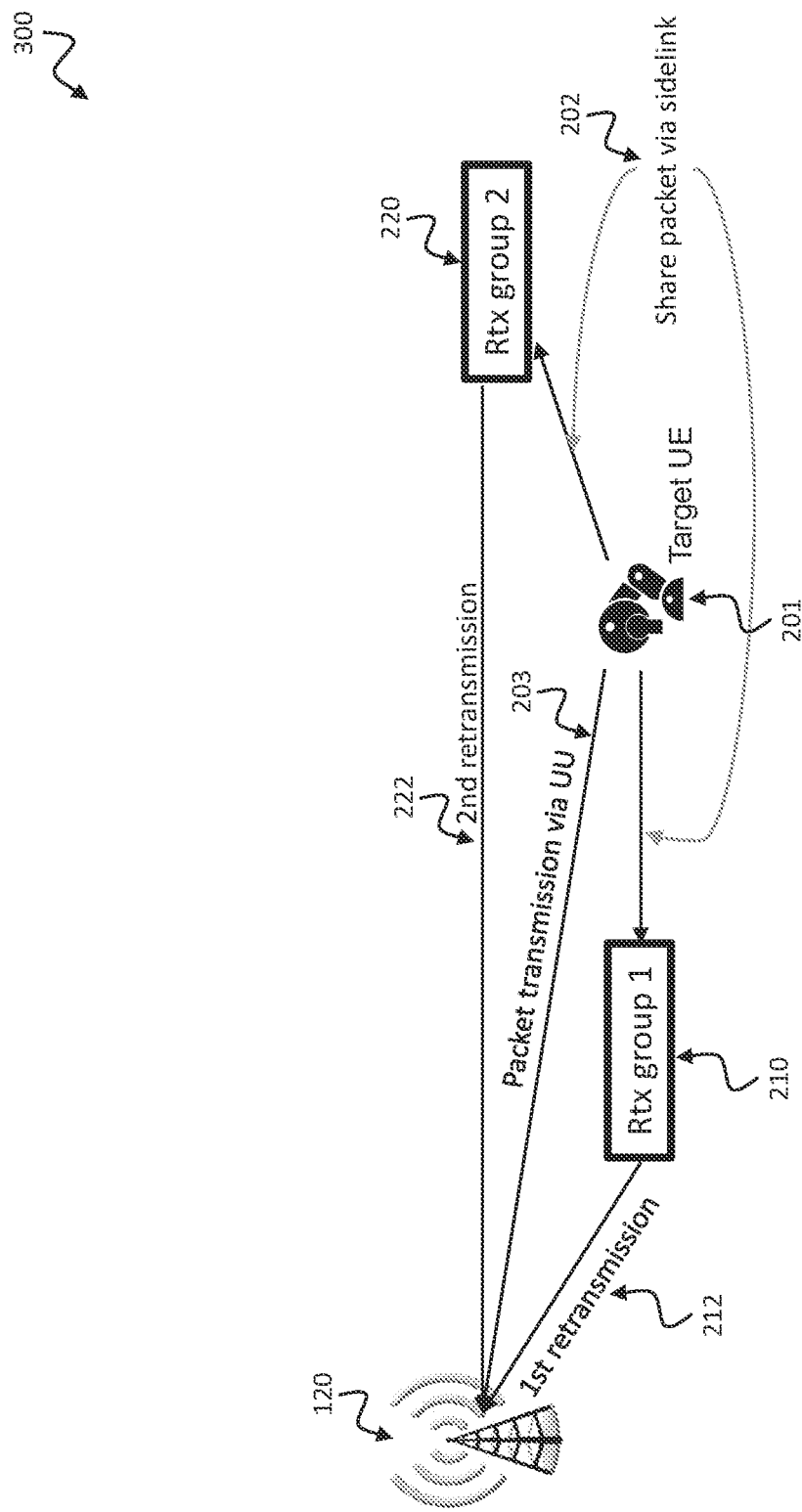
FIG. 3 shows a schematic diagram illustrating exemplary blind cooperative relayed retransmissions for URLLC uplink 300 according to the disclosure.

The scheme is detailed for downlink transmission first, followed by a corresponding description for uplink transmission, see FIG. 3. The downlink scenario, i.e., URLLC transmission from BS 120 to target UE 201, is depicted in FIG. 2 as an example illustration, and the blind retransmission process can be described by the following items:

1) Target UE 201 provides a list of neighbor UEs to BS 120. From the provided list, BS 120 selects those UEs with reasonable link quality on Uu link to form a user group G for multicast transmission, which includes target UE 201. Further, BS 120 forms N retransmission (rtx) groups 210, 220 from selected UEs, where the UEs in each group will cooperatively carry out a single retransmission. In another implementation, the BS 120 may perform the grouping based on information on the UEs collected in the network, e.g., based on the reported Uu and SL radio link qualities, mobility patterns, history information, and predicted link quality. A group may include at least one UE. There may be at least one Rtx group 210, 220. Different group management schemes can also be applied, e.g., by making use of the recommendations coming from network data analytics function (NWDAF) or management data analytics function (MDAF).

2) BS 120 conveys the following control information on blind cooperative retransmission to group G:

2a) Number of rtx groups N, sidelink resources for N retransmissions, target UE as the data sink. The information on the target UE may be explicit, e.g., using a UE identity (ID), or implicit, i.e., can be derived from the context, e.g., if an rtx group has been explicitly defined for an exemplary target UE.

2b) Per each rtx group: UEs in the group, Tx diversity scheme, Tx power per user that may be constant.

2c) Per UE in each rtx group: spatial order (index)— defining the pilot pattern and modulation sequence to be used.

For ease of reference, the control information defined in items 2a), 2b) and 2c) is referred to as the "rtx information", while the partial information covered by items 2b) and 2c) is referred to as the "TX configuration". The rtx information needed to configure the blind cooperative retransmission should be contained in a single DCI message, if possible. However, the assignment of UEs to rtx groups can be kept constant for a long time, and hence there may be no need to update the TX configuration frequently. The TX configuration may thus also be signaled by radio resource control (RRC) on a low time scale, thus saving space in the DCI message fields. A combination of RRC configuration and DCI configuration is also possible, e.g., RRC configuration providing a set of rtx information pieces and DCI configuration activating one of the elements of the set. Depending, e.g., on the size and number of Rtx groups, more than one DCI message may also be utilized, e.g., for different Rtx groups. This may have the advantage of applying different configurations for the different rtx groups, e.g., when these are already assigned a group ID and an associated G-RNTI.

3) BS 120 multi-casts URLLC packet to group G.

4) UEs in the same rtx group 210, 220 that successfully received the URLLC packet from gNB 120 cooperatively retransmit the packet to target UE 201, applying the TX configuration as conveyed through the control channel (DCI or RRC). Only UEs having successfully received the packet will transmit, otherwise keep silent.

5) Target UE 201 combines the packets received from all different transmissions and decodes the packet.
6) Target UE 201 casts ACK to BS 120 and to the rtx group, which, e.g., has contributed highest share to the combined packet, e.g., highest received power.
7) Rtx group determined in item 6 forwards ACK to gNB 120 using the same TX configuration as in prior retransmission.

FIG. 3 shows a schematic diagram illustrating exemplary blind cooperative relayed retransmissions for URLLC uplink 300 according to the disclosure.

The scheme shown in FIG. 3 corresponds to the scheme shown in FIG. 2 but describes the uplink scenario. The scheme includes the base station 120 that connects a plurality of communication devices to a communication network, e.g., according to the scenario depicted in FIGS. 1 and 2. In the scheme shown in FIG. 3, the target UE 201 is connected to the base station 120 via UU link 203 and via sidelink 202 to neighboring UEs. These neighboring UEs are grouped in retransmission (Rtx) groups 210, 220. Like in FIG. 2, an exemplary number of two Rtx groups 210, 220 is shown. However, any other number of Rtx groups can be applied as well. The UEs of Rtx group 1, 210 initiate a first retransmission 212 of data packets received from the target UE 201 to the base station 120, while the UEs of Rtx group 2, 220 initiate a second retransmission 222 of data packets received from the target UE 201 to the base station 120.

The scheme for the uplink, i.e., URLLC transmission from target UE 201 to BS 120, can be described in a very similar way as described above with respect to FIG. 2 and can be detailed by the following items:

1) Target UE 201 provides list of neighbor UEs to BS 120. From the provided list, BS 120 selects those UEs with reasonable link quality on Uu link to form a user group G, 205 for multicast transmission, which includes target UE 201. Further, BS 120 forms N retransmission (rtx) groups 210, 220 from selected UEs. In another implementation, the BS 120 may perform the grouping based on the information on the UEs collected in the network, e.g., based on the Uu and SL radio link qualities, mobility patterns, history information, or predicted link quality. A group may include at least one UE. There may be at least one Rtx group 210, 220. Different group management schemes can also be applied, e.g., by making use of the recommendations coming from network data analytics function (NWDAF) or management data analytics function (MDAF).
2) gNB 120 conveys the following control information to group G, which should be contained in a single DCI message, if possible:
2a) UL grant for target UE 201, including UL resources. It is worth noting that the information on the target UE 201 may be explicit, e.g., using an UE ID, or implicit, i.e., can be derived from the context, e.g., if an rtx group has been explicitly defined for an exemplary target UE 201.
2b) Sidelink resources for forwarding URLLC packet from target UE 201 to its neighbors contained in group G.
2c) Number of rtx groups N, uplink resources for N retransmissions, target UE 201 as the data source.
2d) Per each rtx group 210, 220: UEs in the group, Tx diversity scheme, Tx power per user that may be constant.
2e) Per UE in each rtx group 210, 220: spatial order (index)—defining the pilot pattern and modulation sequence to be used.

Note that the DCI message contains the additional information under items 2a) and 2b) here. The rtx information is now given by items 2c), 2d) and 2e), whereas the TX configuration is given by items 2d) and 2e). As in the downlink case, the TX configuration may change less frequently and may thus be signaled through RRC. A combination of RRC configuration and DCI configuration is also possible, e.g., RRC configuration providing a set of rtx information pieces and DCI configuration activating one of the elements of the set. Depending, e.g., on the size and number of Rtx groups, more than one DCI message may also be utilized, e.g., for different Rtx groups. This may have the advantage of applying different configurations for the different rtx groups, e.g., when these are already assigned a group ID and an associated G-RNTI.

3) Target UE 201 transmits URLLC packet to BS via dedicated UL resources and to neighbor UEs in group G via dedicated sidelink resources.
4) UEs in the same rtx group 210, 220 that successfully received the URLLC packet from target UE cooperatively retransmit the packet to BS 120, applying the TX configuration as conveyed through the control channel (DCI or RRC). Only UEs having successfully received the packet will transmit, otherwise keep silent.
5) BS 120 combines the packets received from all different transmissions and decodes the packet.
6) BS 120 multicasts ACK to target UE 201 and rtx group, which, e.g., has contributed highest share to the combined packet, e.g., highest received power.
7) Rtx group determined under item 6) forwards ACK to target UE 201 using the same TX configuration as in prior retransmission.

Blind cooperative retransmissions for sidelink assisted Uu communications as described in this disclosure provides the following technical advantages: high reliability and availability thanks to exploiting diversity for many independent links; Low latency thanks to pre-scheduled retransmissions which are carried out blindly by neighbouring UEs; Support of larger number of industrial IoT devices thanks to lower bandwidth requirement per each URLLC transmission; The process can be fully controlled and configured by the BS; and an efficient signaling: configurations needed for cooperative retransmissions can be contained within a single DCI message.

Figure 4:
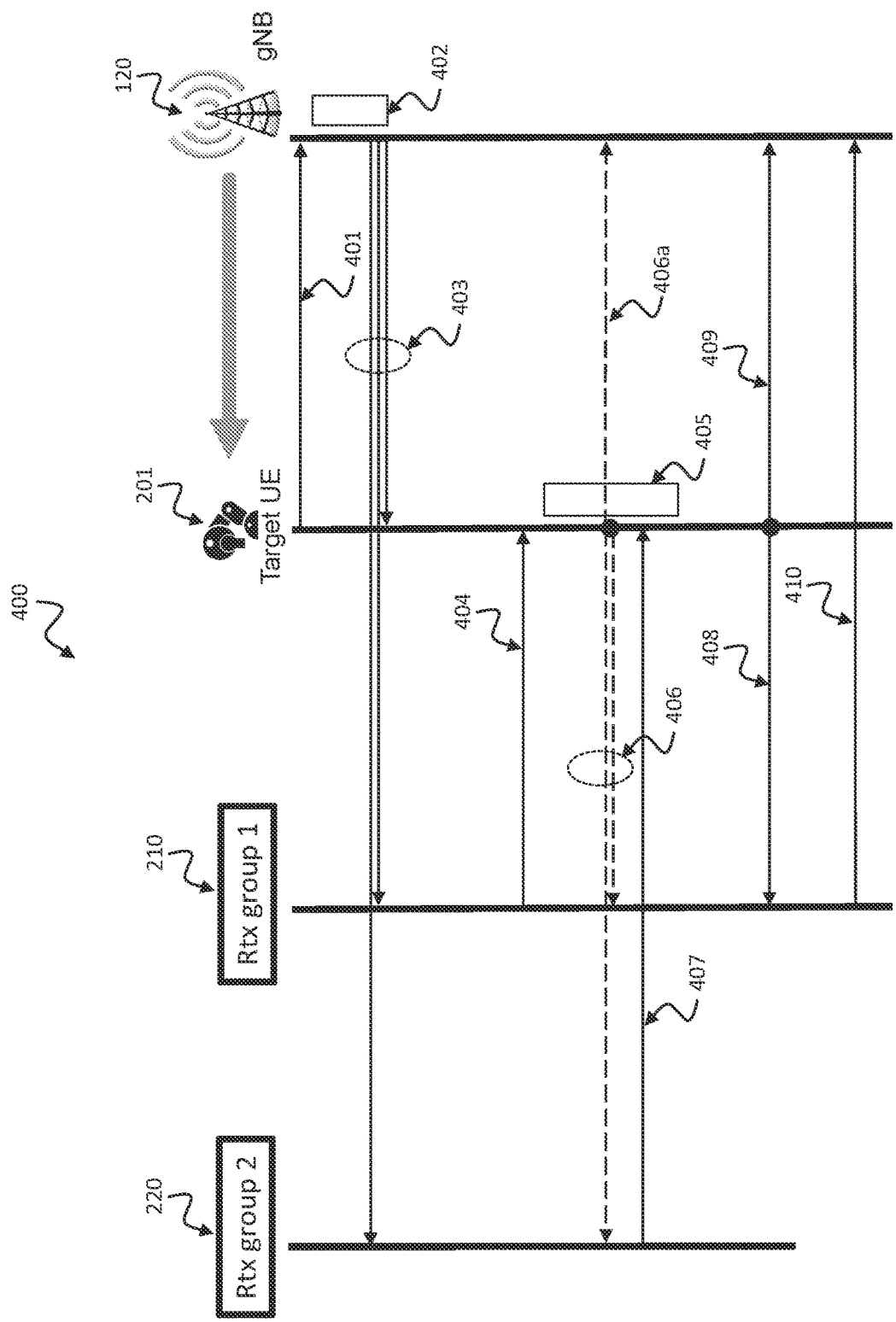
FIG. 4 shows an exemplary message sequence chart 400 illustrating the signaling for the downlink between BS 120, target UE 201 and neighboring UEs grouped into rtx groups 210, 220 according to the disclosure.

FIG. 4 shows an exemplary message sequence chart 400 illustrating the signaling for the downlink between BS 120, target UE 201 and neighboring UEs grouped into rtx groups 210, 220 according to the disclosure. The message sequence chart 400 is an example of a messaging between the Base station 120, the target UE 201 and the neighboring UEs of the two retransmission groups Rtx group 1 and Rtx group 2 as shown in FIG. 2 for the downlink direction.

The message sequence 400 starts with a first message 401 transmitted by the target UE 201 to base station 120. By this first message 401, a list of neighbors with good sidelink quality is shared. Then, BS 120 performs the action 402 to form rtx groups for cooperative retransmission from list of neighbors, in this example for group 1 and 2. In the example of FIG. 4 only two rtx groups 210, 220 are formed by BS 120; However, any other number of rtx groups may be formed by BS 120 as well. Then, BS 120 multicasts URLLC packet to target UE 201 and to rtx groups 210, 220 by multicast message 403. In this multicast message 403, Downlink Control Information (DCI) contains rtx info: rtx groups, sidelink resources for retransmissions and TX configuration per each rtx group (if not signaled earlier by RRC).

The TX configuration contains UEs in the rtx group, Tx diversity scheme, transmit power and spatial order per each UE. This multicast message 403 can be seen as first transmission from BS 120 to UEs.

In response to multicast message 403 a first retransmission 404 on scheduled sidelink resources using Tx configuration of group 1 is sent by Rtx group 1, 210 to target UE 201. In response to multicast message 403 a second retransmission 407 on scheduled sidelink resources using Tx configuration of group 2 is sent by Rtx group 2, 220 to target UE 201. The target RE 201 receives these first and second retransmissions 404, 407 and performs the action 405 to combine packets received from all transmissions 403, 404, 407 and decodes the received packets. When the target UE 201 is able to successfully decode a received packet or a combined packet received from the first and second retransmissions, the target UE 201 transmits an Early ACK message 406a to Base Station 120, an Early ACK message 406 to Rtx group 1 and to Rtx group 2. Message 406 is a group-cast message. The Early ACK message 406 interrupts further retransmissions by Rtx groups 1 and 2 and thus saves retransmissions and allows gNB 120 to reschedule resources.

After successful decoding of a received packet or a combined packet received from the first and second retransmissions, the target UE 201 transmits an ACK message 409 to base station 120 and an ACK message 408 to the rtx group having contributed highest share to combined packet, e.g., to Rtx group 1, 210 in this example. The highest share means that the received packet from retransmission of Rtx group 1 has the highest signal-to-noise ratio or the highest signal quality, for example. This means that the combined packet is mostly constituted of the received packet from retransmission of Rtx group 1. After receiving ACK message 408, Rtx group 1, 210 forwards ACK by message 410 to gNB 120 using the same TX configuration as in prior retransmission.

As exemplified in the message sequence chart 400, the target UE 201 may send an early ACK 406c, 406b to Rtx groups 210, 220 whenever the packet is correctly decoded. Note that this method is compliant with the blind retransmission scheme in 5G NR V2X. This may terminate the retransmissions from other Rtx groups earlier and thus may save resources. The target UE 201 may also provide information to the BS 120 on the Rtx group that contributed highest share to the combined packet, or on the Rtx group where a successful reception could be achieved after its retransmission, in this example Rtx group 1, 210. Such information may be used for the group management and Rtx configuration.

Figure 5:
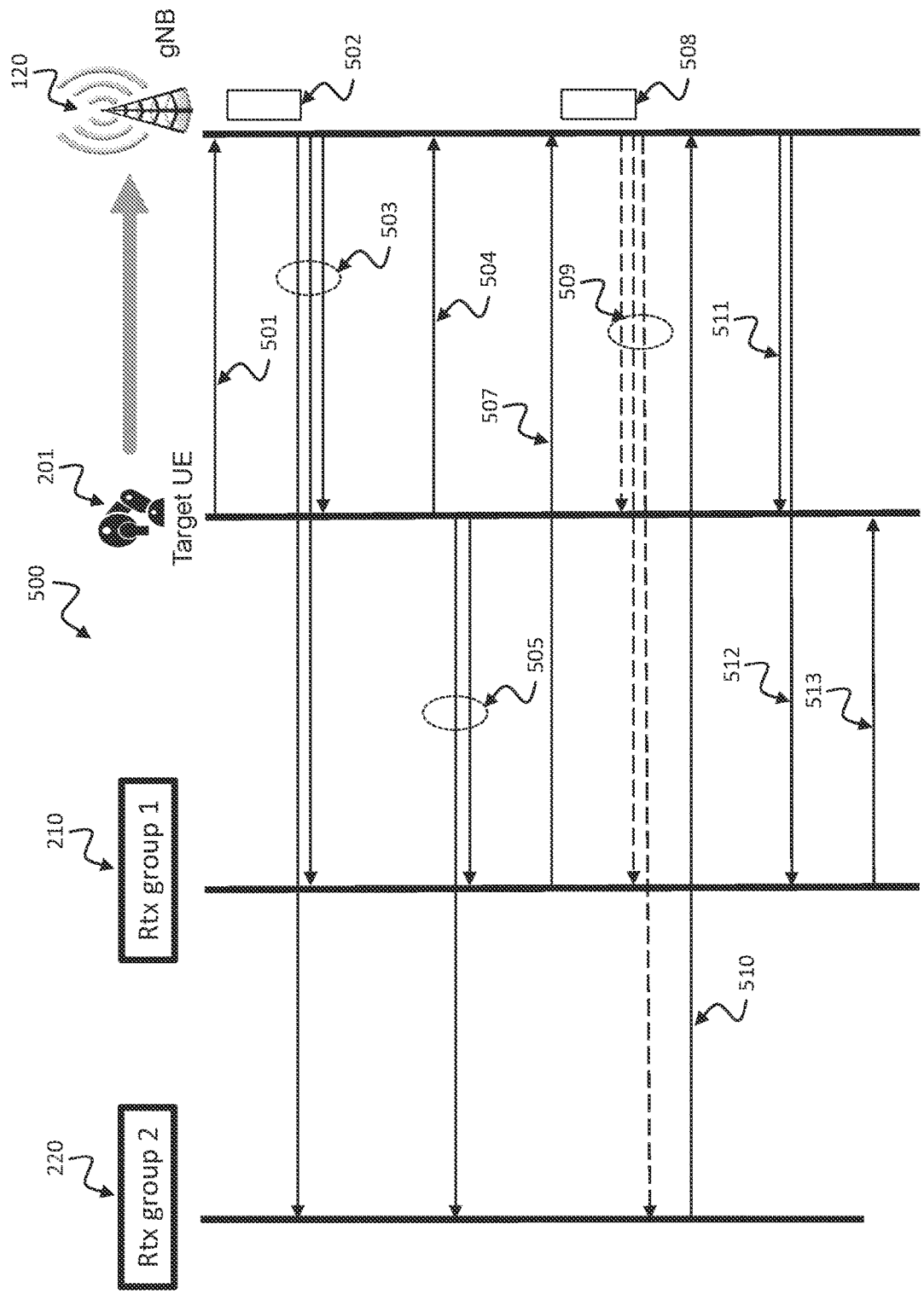
FIG. 5 shows an exemplary message sequence chart 500 illustrating the signaling for the uplink between BS 120, target UE 201 and neighboring UEs grouped into rtx groups 210, 220 according to the disclosure.

FIG. 5 shows an exemplary message sequence chart 500 illustrating the signaling for the uplink between BS 120, target UE 201 and neighboring UEs grouped into rtx groups 210, 220 according to the disclosure. The message sequence chart 500 is an example of a messaging between the Base station 120, the target UE 201 and the neighboring UEs of the two retransmission groups Rtx group 1 and Rtx group 2 as shown in FIG. 3 for the uplink direction.

The message sequence 500 starts with a first message 501 transmitted by the target UE 201 to base station 120. By this first message 501, a list of neighbors with good sidelink quality is shared. Then, BS 120 performs the action 502 to form rtx groups for cooperative retransmission from list of neighbors, in this example for group 1 and 2. In the example of FIG. 5 only two rtx groups 210, 220 are formed by BS 120; However, any other number of rtx groups may be formed by BS 120 as well. Then, BS 120 multicasts DCI to target UE 201 and to rtx groups 210, 220 by multicast messages 503. In this multicast message 503, DCI contains scheduling grant for target UE and sidelink resources for sharing packet and rtx information (if not signaled by RRC).

Then, target UE 201 transmits URLLC packet by message 504 to base station 120 and multicasts URLLC packet to all UEs in the rtx groups by groupcast message 505 to Rtx group 2, 220 and to Rtx group 1, 210. In response to multicast message 506 a first retransmission 507 on scheduled uplink resources using Tx configuration of group 1 is sent by Rtx group 1, 210 to base station 120. In response to multicast message 505 a second retransmission 510 on scheduled uplink resources using Tx configuration of group 2 is sent by Rtx group 2, 220 to base station 120. The gNB 120 receives these first and second retransmissions 507, 510 and performs the action 508 to combine packets received from all transmissions 504, 507, 510 and decodes the receive packets. When the gNB 120 is able to successfully decode a received packet or a combined packet, the gNB 120 transmits an Early ACK message 509 to target UE 201, to Rtx group 1 and to Rtx group 2. The Early ACK message 509 is multicast to the entire group. The Early ACK message 509 interrupts further retransmissions by Rtx groups 1 and 2 and thus saves retransmissions and allows gNB 120 to reschedule resources.

After successful decoding of a received packet or a combined packet received from the first and second retransmissions, the gNB 120 multicasts an ACK message 511 to target UE 201 and an ACK message 512 to the rtx group having contributed highest share to combined packet, e.g., to Rtx group 1, 210 in this example. The highest share means that the received packet from retransmission of Rtx group 1 has the highest signal-to-noise ratio or the highest signal quality, for example. This means that the combined packet is mostly constituted of the received packet from retransmission of Rtx group 1. After receiving ACK message 512, Rtx group 1, 210 forwards ACK by message 513 to target UE 201 using the same TX configuration as in prior retransmission.

As exemplified in the message sequence chart 500, the BS 120 may send an early ACK to Rtx groups whenever the packet is correctly decoded. This may terminate the retransmissions from other Rtx groups earlier and thus may save resources. This method is compliant with the blind retransmission scheme in 5G NR V2X. The information on the Rtx group that has contributed highest share to the combined packet, or on the Rtx group where a successful reception could be achieved after its retransmission, may be used for the group management and Rtx configuration.

Figure 6:
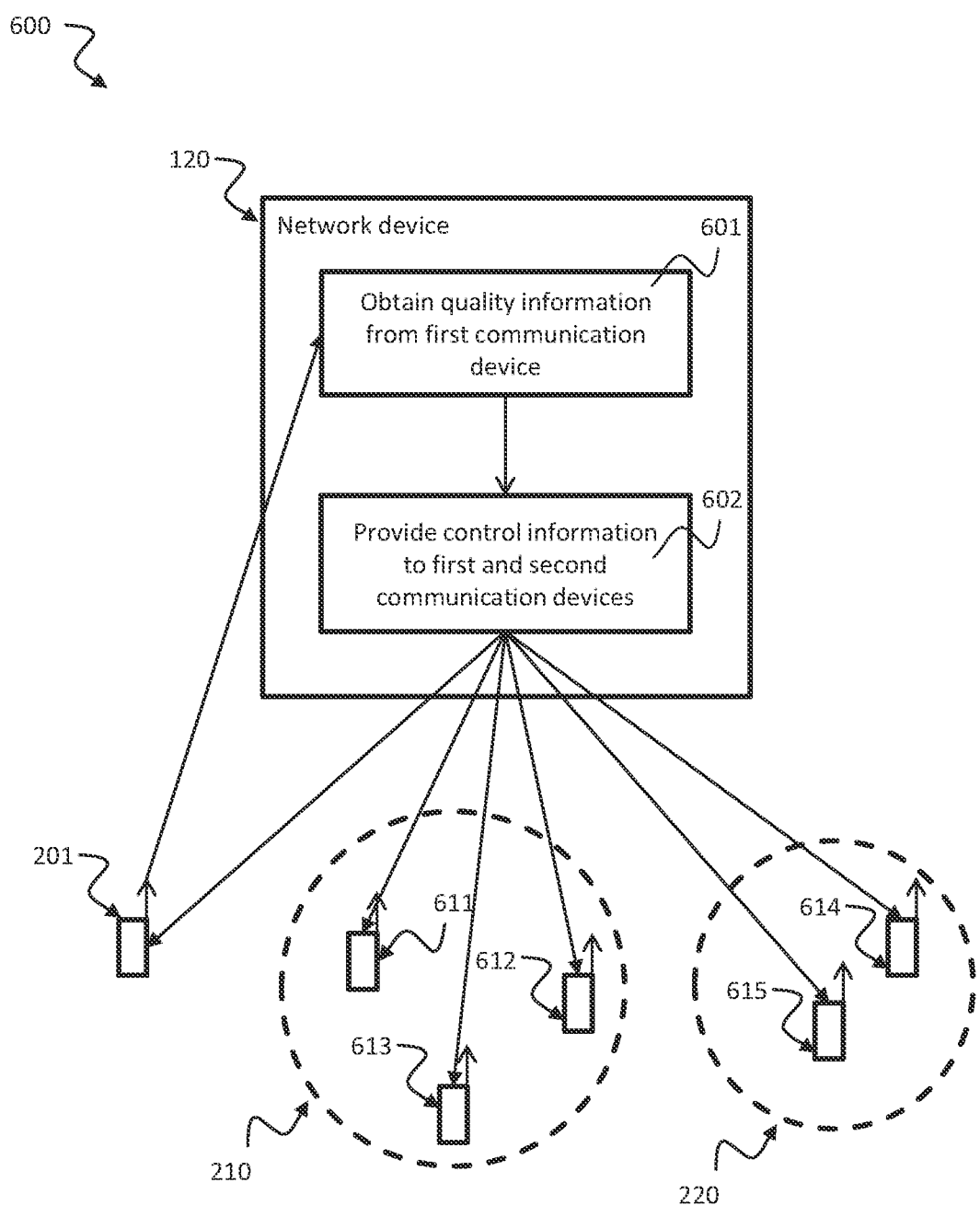
FIG. 6 shows a schematic diagram illustrating a communication network 600 with a network device 120 according to the disclosure.

FIG. 6 shows a schematic diagram illustrating a communication network 600 with a network device 120 according to the disclosure. The network device 120 may correspond to the network device 120 or base station or gNB as described above with respect to FIGS. 1 to 5.

The network device 120 is configured to: obtain 601, from a first communication device 201, quality information about a quality of a radio link of the first communication device 201 to one or more second communication devices 611, 612, 613, 614, 615; and provide 602 to the one or more second communication devices 611, 612, 613, 614, 615 and to the first communication device 201 control information. The control information includes: membership information about a membership of the one or more second communication devices 611, 612, 613, 614, 615 to one or more retransmission groups 210, 220, and instructions on a group-specific retransmission of a data packet by the members of a retransmission group 210, 220. The retransmission groups 210, 220 may correspond to the retransmission groups 210, 220 as described above with respect to FIGS. 1 to 5.

The first communication device 201 may correspond to the target UE 201 as described above with respect to FIGS. 1 to 5. The second communication devices 611, 612, 613, 614, 615 may correspond to the neighboring UEs of Rtx groups 210, 220 as described above with respect to FIGS. 1 to 5.

The control information may comprise a group-specific transmission diversity scheme and a group-specific transmission power per communication device for each retransmission group 210, 220, e.g., as described above with respect to FIGS. 1 to 5.

The network device 120 may be configured to provide the membership information, the group-specific transmission diversity scheme and the group-specific transmission power by radio resource control (RRC) signaling or by Downlink Control Information (DCI) signaling, e.g., as described above with respect to FIGS. 1 to 5.

The control information may comprise a group-specific retransmission resource for each second communication device 611, 612, 613, 614, 615 of a retransmission group 210, 220. The network device 120 may be configured to provide information on the group-specific retransmission resource by DCI signaling, e.g., as described above with respect to FIGS. 1 to 5.

The instructions may instruct the second communication devices 611, 612, 613 of a respective retransmission group, e.g., retransmission group 210, to retransmit the data packet by using the group-specific retransmission resource and applying the group-specific transmission diversity scheme and the group-specific transmission power, e.g., as described above with respect to FIGS. 1 to 5.

The DCI signaling may comprise a retransmission group index indicating a respective retransmission group 210, 220 for carrying out a retransmission, e.g., as described above with respect to FIGS. 1 to 5.

The instructions on the group-specific retransmission of a data packet may instruct the members of a retransmission group 210, 220 to cooperatively carry out a retransmission of the same data packet, e.g., as described above with respect to FIGS. 1 to 5.

The network device 120 may be configured to: combine uplink data packets received from a transmission of the first communication device 201 and/or from a retransmission of at least one second communication device 611, 612, 613, 614, 615; and decode a combined uplink data packet resulting from the combination, e.g., as described above with respect to FIGS. 1 to 5.

The network device 120 may be configured to transmit an early acknowledge message to the first communication device 201 and/or the one or more second communication devices 611, 612, 613, 614, 615 upon successfully decoding the combined uplink data packet, e.g., as described above with respect to FIGS. 1 to 5. The early acknowledge message may indicate a successful decoding and instructs the one or more second communication devices 611, 612, 613, 614, 615 to interrupt retransmission, e.g., as described above with respect to FIGS. 1 to 5.

The network device 120 may be configured to: determine a respective signal quality of the uplink data packets received from the retransmissions of the one or more second communication devices 611, 612, 613, 614, 615; and transmit an acknowledge message to the first communication device 201 and to all second communication devices belonging to the retransmission group of the second communication device which retransmission has the highest signal quality, e.g., as described above with respect to FIGS. 1 to 5.

Figure 7:
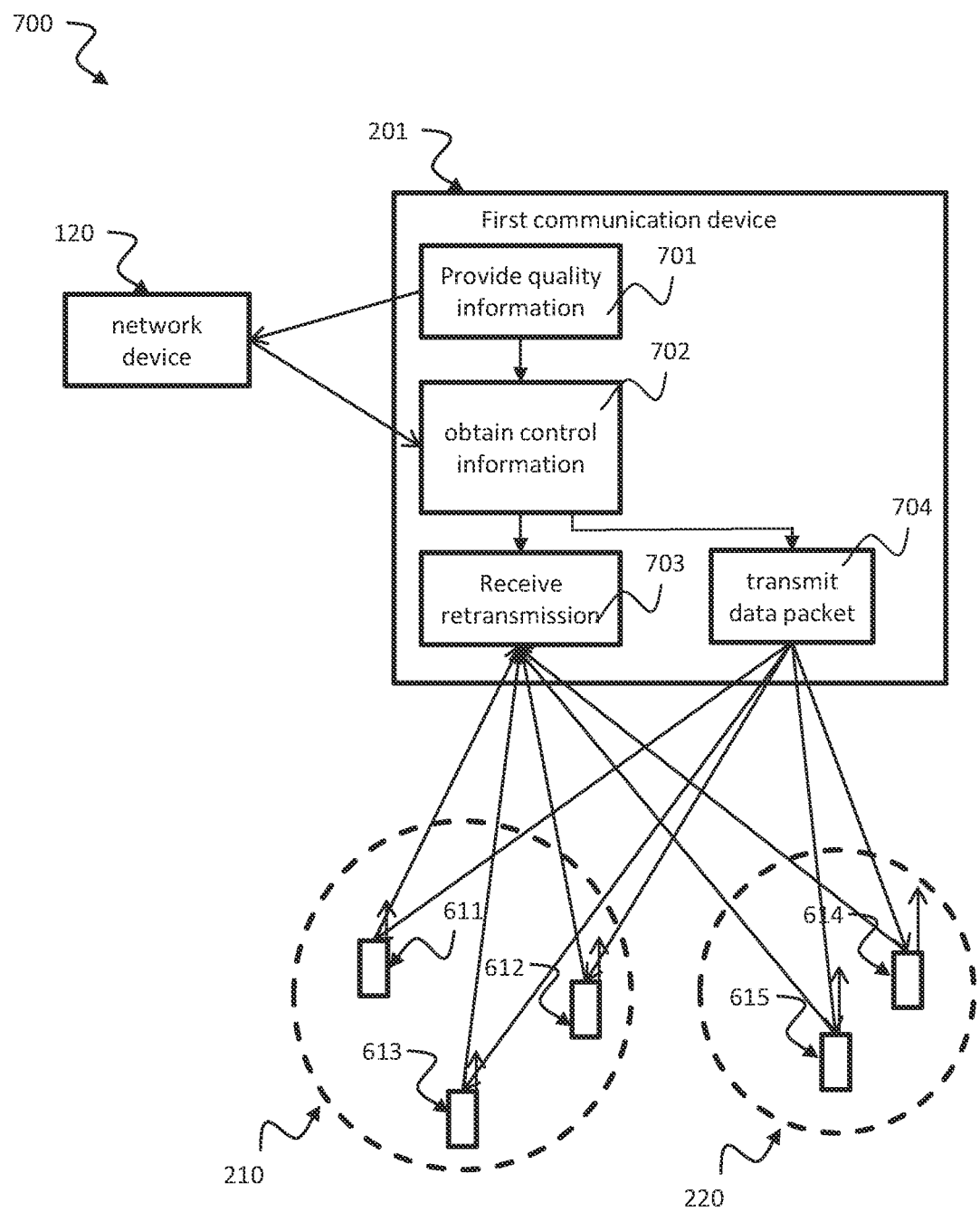
FIG. 7 shows a schematic diagram illustrating a communication network 700 with a first communication device 201 according to the disclosure.

FIG. 7 shows a schematic diagram illustrating a communication network 700 with a first communication device 201 according to the disclosure. The first communication device 201 may correspond to the target UE 201 as described above with respect to FIGS. 1 to 5.

The first communication device 201 is configured to: provide 701, to a network device 120, quality information about a quality of a radio link of the first communication device to one or more second communication devices; obtain 702 control information from the network device 120, wherein the control information includes: membership information about a membership of the one or more second communication devices 611, 612, 613, 614, 615 to one or more retransmission groups 210, 220, and instructions on a group-specific retransmission of a data packet by the members of a retransmission group 210, 220; and receive 703 at least one retransmission of a data packet from the one or more second communication devices 611, 612, 613, 614, 615 according to the control information, and/or transmit 704 a data packet for the network device 120 to the one or more second communication devices 611, 612, 613, 614, 615 according to the control information.

The second communication devices 611, 612, 613, 614, 615 may correspond to the neighboring UEs of Rtx groups 210, 220 as described above with respect to FIGS. 1 to 5.

The control information may comprise a group-specific transmission diversity scheme and a group-specific transmission power per communication device for each retransmission group 210, 220, e.g., as described above with respect to FIGS. 1 to 5. The first communication device 201 may be configured to obtain the membership information, the group-specific transmission diversity scheme and the group-specific transmission power by radio resource control (RRC) signaling or by Downlink Control Information (DCI) signaling.

The control information may comprise a group-specific retransmission resource for each second communication device 611, 612, 613, 614, 615 of a retransmission group 210, 220, e.g., as described above with respect to FIGS. 1 to 5. The first communication device 201 may be configured to obtain information on the group-specific retransmission resource by DCI signaling.

The first communication device 201 may be configured to: combine downlink data packets received from a transmission of the network device 120 and/or from a retransmission of at least one second communication device 611, 612, 613, 614, 615; and decode a combined downlink data packet resulting from the combination, e.g., as described above with respect to FIGS. 1 to 5.

The first communication device 201 may be configured to: transmit an early acknowledge message to the network device 120 and the one or more second communication devices 611, 612, 613, 614, 615 upon successfully decoding the combined downlink data packet, wherein the early acknowledge message indicates a successful decoding and instructs the one or more second communication devices 611, 612, 613, 614, 615 to interrupt retransmission, e.g., as described above with respect to FIGS. 1 to 5.

The first communication device 201 may be configured to: determine a respective signal quality of the downlink data packets received from the retransmissions of the second communication devices 611, 612, 613, 614, 615; and transmit an acknowledge message to the network device 120 and to all second communication devices belonging to the retransmission group of the second communication which retransmission has the highest signal quality, e.g., as described above with respect to FIGS. 1 to 5.

Figure 8:
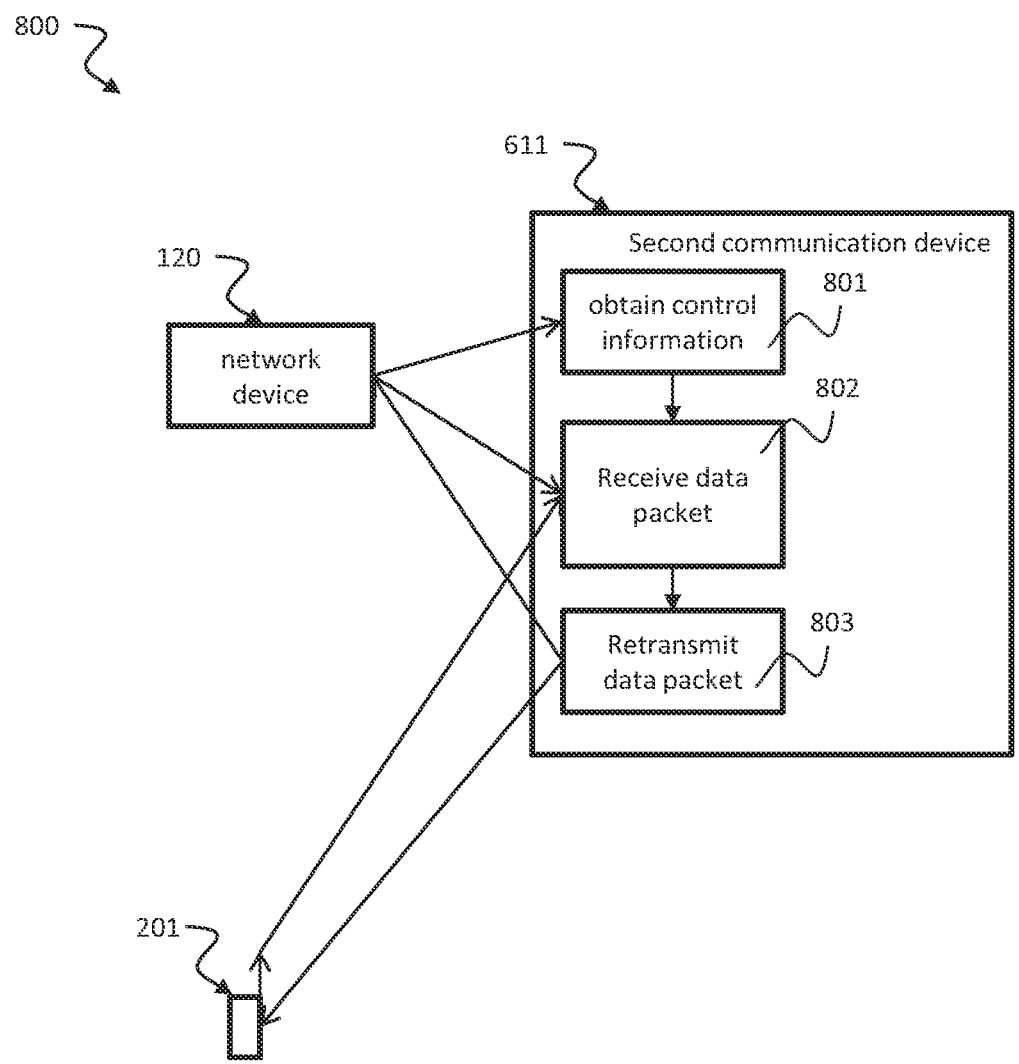
FIG. 8 shows a schematic diagram illustrating a communication network 800 with a second communication device 611 according to the disclosure.

FIG. 8 shows a schematic diagram illustrating a communication network 800 with a second communication device 611 according to the disclosure. The second communication device 611 may correspond to one of the neighboring UEs of Rtx groups 210, 220 as described above with respect to FIGS. 1 to 5.

The second communication device 611 is configured to obtain 801 control information from a network device, wherein the control information includes information about a membership of the second communication device 611 to a retransmission group 210, 220 of one or more retransmission groups and instructions on a group-specific retransmission of a data packet by the members of a retransmission group 210, 220, e.g., as described above with respect to FIGS. 1 to 5.

The second communication device 611 is configured to receive a data packet from the network device 120 or from the first communication device 201, e.g., as described above with respect to FIGS. 1 to 5.

The second communication device 611 is configured to retransmit the data packet to the first communication device 201 or the network device 120 according to the control information, e.g., as described above with respect to FIGS. 1 to 5.

The second communication device 611 may be configured to retransmit the data packet on a sidelink radio link to the first communication device 201 or on an Uu radio link to the network device 120.

The second communication device 611 may be configured to receive the control information from the network device by a Downlink Control Information, DCI, message.

The control information may comprise a group-specific transmission diversity scheme and a group-specific transmission power per communication device for each retransmission group. The control information may further comprise a group-specific retransmission resource for each second communication device of a retransmission group.

The instructions may instruct the second communication device 611 to retransmit the data packet by using the group-specific retransmission resource and applying the group-specific transmission diversity scheme and the group-specific transmission power.

Figure 9:
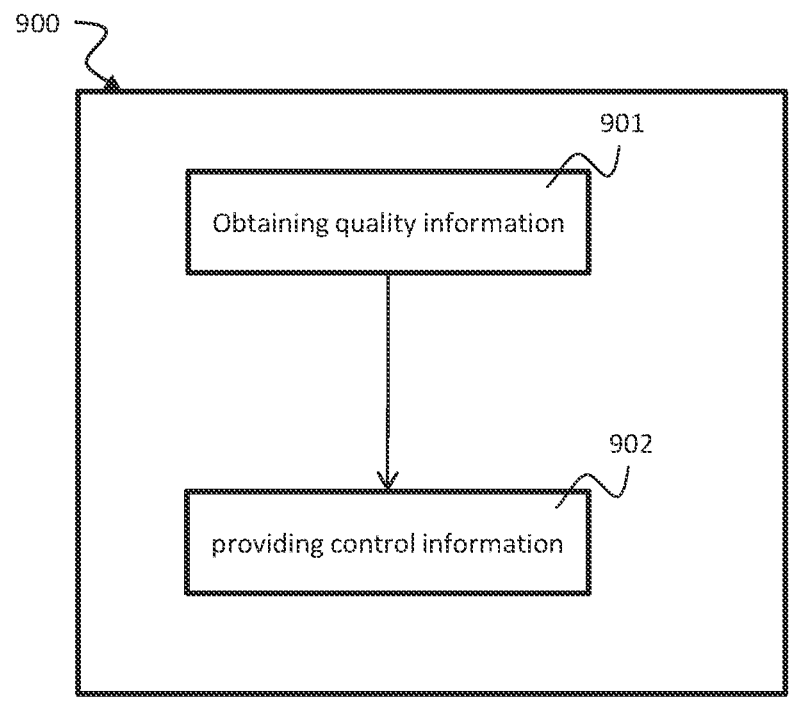
FIG. 9 shows a schematic diagram of a method 900 for configuring a communication network for cooperative retransmission according to the disclosure.

FIG. 9 shows a schematic diagram of a method 900 for configuring a communication network for cooperative retransmission according to the disclosure.

The method 900 is for configuring a first communication device 201 and one or more second communication devices 611, 612, 613, 614, 615 for cooperative retransmission, e.g., as described above with respect to FIGS. 1 to 5.

The method 900 comprises: obtaining 901, from the first communication device 210, quality information about a quality of a radio link of the first communication device to one or more second communication devices 611, 612, 613, 614, 615.

The method 900 comprises: providing 902, to the one or more second communication devices 611, 612, 613, 614, 615 and to the first communication device 201, control information, wherein the control information includes: membership information about a membership of the one or more second communication devices 611, 612, 613, 614, 615 to the one or more retransmission groups 210, 220, and instructions on a group-specific retransmission of a data packet by the members of a retransmission group 210, 220.

The control information may comprise a group-specific transmission diversity scheme and a group-specific transmission power per communication device for each retransmission group 210, 220, e.g., as described above with respect to FIGS. 1 to 5. The method may further comprise: providing the membership information, the group-specific transmission diversity scheme and the group-specific transmission power by radio resource control, RRC, signaling or by Downlink Control Information, DCI, signaling.

The control information may comprise a group-specific retransmission resource for each second communication device 611, 612, 613, 614, 615 of a retransmission group. The method may further comprise: providing information on the group-specific retransmission resource by DCI signaling, e.g., as described above with respect to FIGS. 1 to 5.

Figure 10:
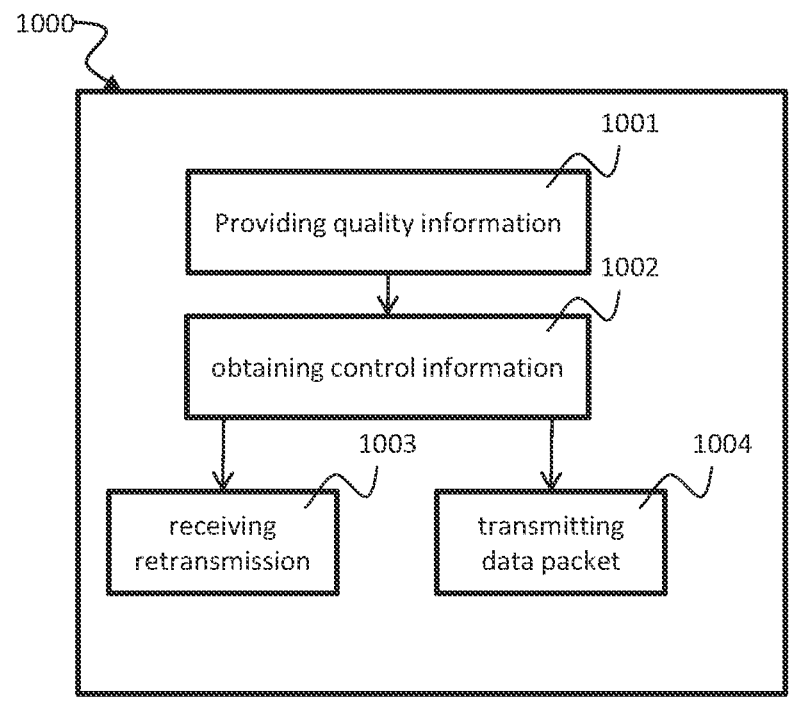
FIG. 10 shows a schematic diagram of a method 1000 for performing cooperative retransmission by a first communication device 201 according to the disclosure.

FIG. 10 shows a schematic diagram of a method 1000 for performing cooperative retransmission by a first communication device 201 according to the disclosure.

The method 1000 comprises: providing 1001, to a network device 120, quality information about a quality of a radio link of the first communication device 201 to one or more second communication devices 611, 612, 613, 614, 615, e.g., as described above with respect to FIGS. 1 to 5.

The method 1000 comprises: obtaining 1002 control information from the network device 120, wherein the control information includes: membership information about a membership of the one or more second communication devices to one or more retransmission groups, and instructions on a group-specific retransmission of a data packet by the members of a retransmission group, e.g., as described above with respect to FIGS. 1 to 5.

The method 1000 comprises: receiving 1003 at least one retransmission of a data packet from the one or more second communication devices 611, 612, 613, 614, 615 according to the control information, and/or transmitting 1004 a data packet for the network device to the one or more second communication devices 611, 612, 613, 614, 615 according to the control information, e.g., as described above with respect to FIGS. 1 to 5.

The method 1000 may further comprise: combining downlink data packets received from a transmission of the network device 120 and/or from a retransmission of at least one second communication device 611, 612, 613, 614, 615; and decoding a combined downlink data packet resulting from the combination, e.g., as described above with respect to FIGS. 1 to 5.

The method 1000 may further comprise: transmitting an early acknowledge message to the network device 120 and the one or more second communication devices 611, 612, 613, 614, 615 upon successfully decoding the combined downlink data packet, wherein the early acknowledge message indicates a successful decoding and instructs the one or more second communication devices to interrupt retransmission, e.g., as described above with respect to FIGS. 1 to 5.

Figure 11:
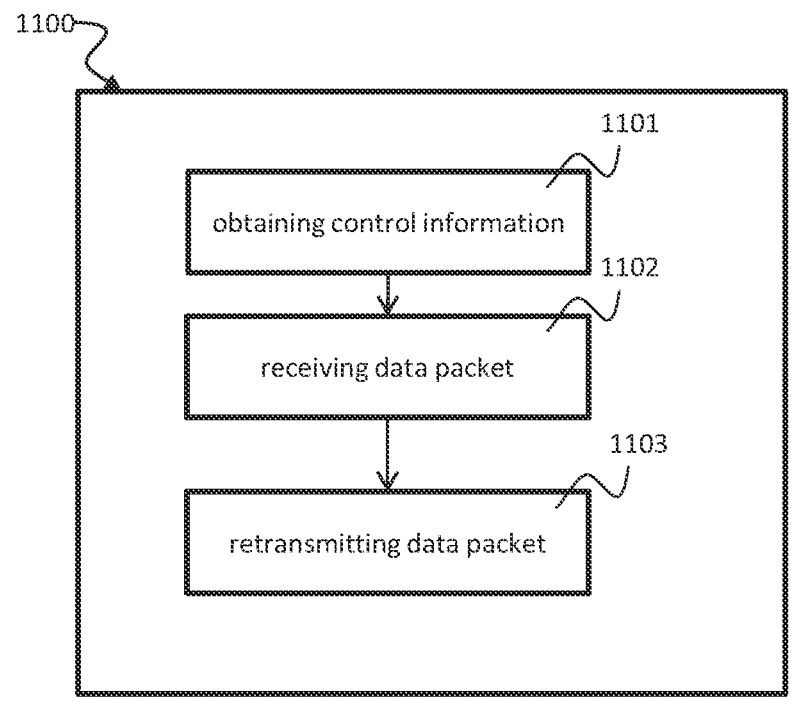
FIG. 11 shows a schematic diagram of a method 1100 for performing cooperative retransmission by a second communication device 611 according to the disclosure.

FIG. 11 shows a schematic diagram of a method 1100 for performing cooperative retransmission by a second communication device 611 according to the disclosure.

The method 1100 comprises: obtaining 1101 control information from a network device, wherein the control information includes: membership information about a membership of the second communication device 611 to a retransmission group 210, 220 of one or more retransmission groups and instructions on a group-specific retransmission of a data packet by the members of a retransmission group 210, 220, e.g., as described above with respect to FIGS. 1 to 5.

The method 1100 comprises: receiving 1102 a data packet from the network device 120 or from the first communication device 201, e.g., as described above with respect to FIGS. 1 to 5.

The method 1100 comprises: retransmitting 1103 the data packet to the first communication device 201 or the network device 120 according to the control information, e.g., as described above with respect to FIGS. 1 to 5.

The method 1100 may further comprise: retransmitting the data packet on a sidelink radio link to the first communication device or on an Uu radio link to the network device.

The method 1100 may further comprise: receiving the control information from the network device by a Downlink Control Information (DCI) message.

The control information may comprise a group-specific transmission diversity scheme and a group-specific transmission power per communication device for each retransmission group, and additionally a group-specific retransmission resource for each second communication device of a retransmission group.

The method 1100 may further comprise: retransmitting the data packet by using the group-specific retransmission resource and applying the group-specific transmission diversity scheme and the group-specific transmission power.

The present disclosure also supports a computer program product including computer executable code or computer executable instructions that, when executed, causes at least one computer to execute the performing and computing steps described herein, in particular, the methods and procedures described above. Such a computer program product may include a readable non-transitory storage medium storing program code thereon for use by a computer. The program code may perform the processing and computing steps described herein, in particular, the methods and procedures described above.

While an exemplary feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although exemplary aspects have been illustrated and described herein, it will be appreciated by those of ordinary skill in the art that a variety of alternate and/or equivalent implementations may be substituted for the exemplary aspects shown and described without departing from the scope of the present disclosure. This application is intended to cover any adaptations or variations of the exemplary aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more exemplary embodiments, those skilled in the art recognize that many changes may be made thereto without departing from the scope of the present disclosure. It is therefore to be understood that within the scope of the appended claims and their equivalents, the disclosure may be practiced otherwise than as described herein.

What is claimed is:

1. A network device, wherein the network device comprises a processor, and the network device is configured to:
obtain, from a first communication device, quality information about a quality of a radio link of the first communication device to one or more second communication devices; and
provide to the one or more second communication devices and to the first communication device control information, wherein the control information comprises:
membership information about a membership of the one or more second communication devices to one or more retransmission groups,
instructions on a group-specific retransmission of a data packet by members of a retransmission group of the one or more retransmission groups, wherein the instructions on the group-specific retransmission of the data packet instruct the members of the retransmission group to cooperatively carry out the retransmission of the data packet, and
a group-specific transmission diversity scheme and a group-specific transmission power per communication device for each of the one or more retransmission groups.

2. The network device of claim 1, wherein the network device is configured to provide the membership information, the group-specific transmission diversity scheme and the group-specific transmission power by radio resource control (RRC) signaling or by downlink control information (DCI) signaling.

3. The network device of claim 2, wherein the control information comprises a group-specific retransmission resource for each of the one or more second communication devices of each of the one or more retransmission groups,
wherein the network device is configured to provide information on the group-specific retransmission resource by the DCI signaling.

4. The network device of claim 3, wherein the instructions are configured to instruct the one or more second communication devices of a respective retransmission group to retransmit the data packet by using the group-specific retransmission resource and applying the group-specific transmission diversity scheme and the group-specific transmission power.

5. The network device of claim 2, wherein the DCI signaling comprises a retransmission group index indicating a respective one of the retransmission groups for carrying out a retransmission.

6. The network device of claim 2, wherein the network device is further configured to:
combine uplink data packets received from a transmission of the first communication device or from a retransmission of at least one of the one or more second communication devices; and decode a combined uplink data packet based on the combination.

7. The network device of claim 6, wherein the network device is further configured to:
  transmit an early acknowledge message to the first communication device or the one or more second communication devices upon successfully decoding the combined uplink data packet,
  wherein the early acknowledge message indicates the successful decoding and instructs the one or more second communication devices to interrupt retransmission.

8. The network device of claim 6, wherein the network device is further configured to:
  determine a respective signal quality of the uplink data packets received from the retransmissions of the at least one of the one or more second communication devices; and
  transmit an acknowledgement message to the first communication device and to second communication devices belonging to the one or more retransmission groups of the one or more second communication devices which retransmission has the highest signal quality.

9. A first communication device, wherein the first communication device comprises a first processor, and the first communication device is configured to:
  provide to a network device quality information about a quality of a radio link of the first communication device to one or more second communication devices; and
  obtain control information from the network device, wherein the control information comprises:
    membership information about a membership of the one or more second communication devices to one or more retransmission groups,
    instructions on a group-specific retransmission of a data packet by members of a retransmission group of the one or more retransmission groups, wherein the instructions on the group-specific retransmission of the data packet instruct the members of the retransmission group to cooperatively carry out the retransmission of the data packet, and
    a group-specific transmission diversity scheme and a group-specific transmission power per communication device for each of the one or more retransmission groups; and
  receive at least one retransmission of the data packet from the one or more second communication devices according to the control information, or
  transmit the data packet for the network device to the one or more second communication devices according to the control information.

10. The first communication device of claim 9, wherein the first communication device is configured to obtain the membership information, the group-specific transmission diversity scheme and the group-specific transmission power by radio resource control (RRC) signaling or by downlink control information (DCI) signaling.

11. The first communication device of claim 10, wherein the control information comprises a group-specific retransmission resource for each of the one or more second communication devices of each of the one or more retransmission groups,
  wherein the first communication device is configured to obtain information on the group-specific retransmission resource by the DCI signaling.

12. The first communication device of claim 9, wherein the first communication device is further configured to:
  combine downlink data packets received from a transmission of the network device or from a retransmission of at least one of the second communication devices; and
  decode a combined downlink data packet based on the combination.

13. The first communication device of claim 12, wherein the first communication device is further configured to:
  transmit an early acknowledge message to the network device and the one or more second communication devices upon successfully decoding the combined downlink data packet,
  wherein the early acknowledge message indicates the successful decoding and instructs the one or more second communication devices to interrupt retransmission.

14. The first communication device of claim 12, wherein the first communication device is further configured to:
  determine a respective signal quality of the downlink data packets received from the retransmissions of the at least one of the one or more second communication devices; and
  transmit an acknowledgement message to the network device and to second communication devices belonging to the one or more retransmission group of the one or more second communication devices which retransmission has the highest signal quality.

15. A method for configuring a first communication device and one or more second communication devices for cooperative retransmission, the method comprising:
  obtaining, from the first communication device, quality information about a quality of a radio link of the first communication device to at least one of the one or more second communication devices; and
  providing, to the one or more second communication devices and to the first communication device control information,
  wherein the control information comprises:
    membership information about a membership of the one or more second communication devices to one or more retransmission groups,
    instructions on a group-specific retransmission of a data packet by members of a retransmission group of the one or more retransmission groups, wherein the instructions on the group-specific retransmission of the data packet instruct the members of the retransmission group to cooperatively carry out the retransmission of the data packet, and
    a group-specific transmission diversity scheme and a group-specific transmission power per communication device for each of the one or more retransmission groups.

16. The method of claim 15, further comprising:
  providing the membership information, the group-specific transmission diversity scheme and the group-specific transmission power by radio resource control (RRC) signaling or by downlink control information (DCI) signaling.

17. The method of claim 16, wherein the control information comprises a group-specific retransmission resource for each of the one or more second communication devices of the retransmission group,
  wherein the method further comprises:
    providing information on the group-specific retransmission resource by the DCI signaling.

18. A method for performing cooperative retransmission by a first communication device, the method comprising:

providing, to a network device, quality information about a quality of a radio link of the first communication device to one or more second communication devices; and obtaining control information from the network device, wherein the control information comprises:

membership information about a membership of the one or more second communication devices to one or more retransmission groups, instructions on a group-specific retransmission of a data packet by members of a retransmission group of the one or more retransmission groups, wherein the instructions on the group-specific retransmission of the data packet instruct the members of the retransmission group to cooperatively carry out the retransmission of the data packet, and a group-specific transmission diversity scheme and a group-specific transmission power per communication device for each of the one or more retransmission groups; and receiving at least one retransmission of the data packet from the one or more second communication devices according to the control information; and/or transmitting the data packet for the network device to the one or more second communication devices according to the control information.

19. The method of claim 18, comprising:

combining downlink data packets received from at least one of a transmission of the network device and a retransmission of at least one of the one or more second communication devices; and decoding a combined downlink data packet based on the combination.

20. The method of claim 19, comprising:

transmitting, by the processor, an acknowledgement message to the network device and the one or more second communication devices upon successfully decoding the combined downlink data packet, wherein the acknowledgement message indicates the successful decoding and instructs the one or more second communication devices to interrupt retransmission.

21. A non-transitory computer-readable storage medium comprising a computer program product comprising program code to perform the method according to claim 15, when executed by a computer.

* * * * *